Nov. 6, 1923.
H. CLARK
COMBINED ANTIGLARE AND WEATHER SHIELD
Filed April 11, 1921
1,473,599
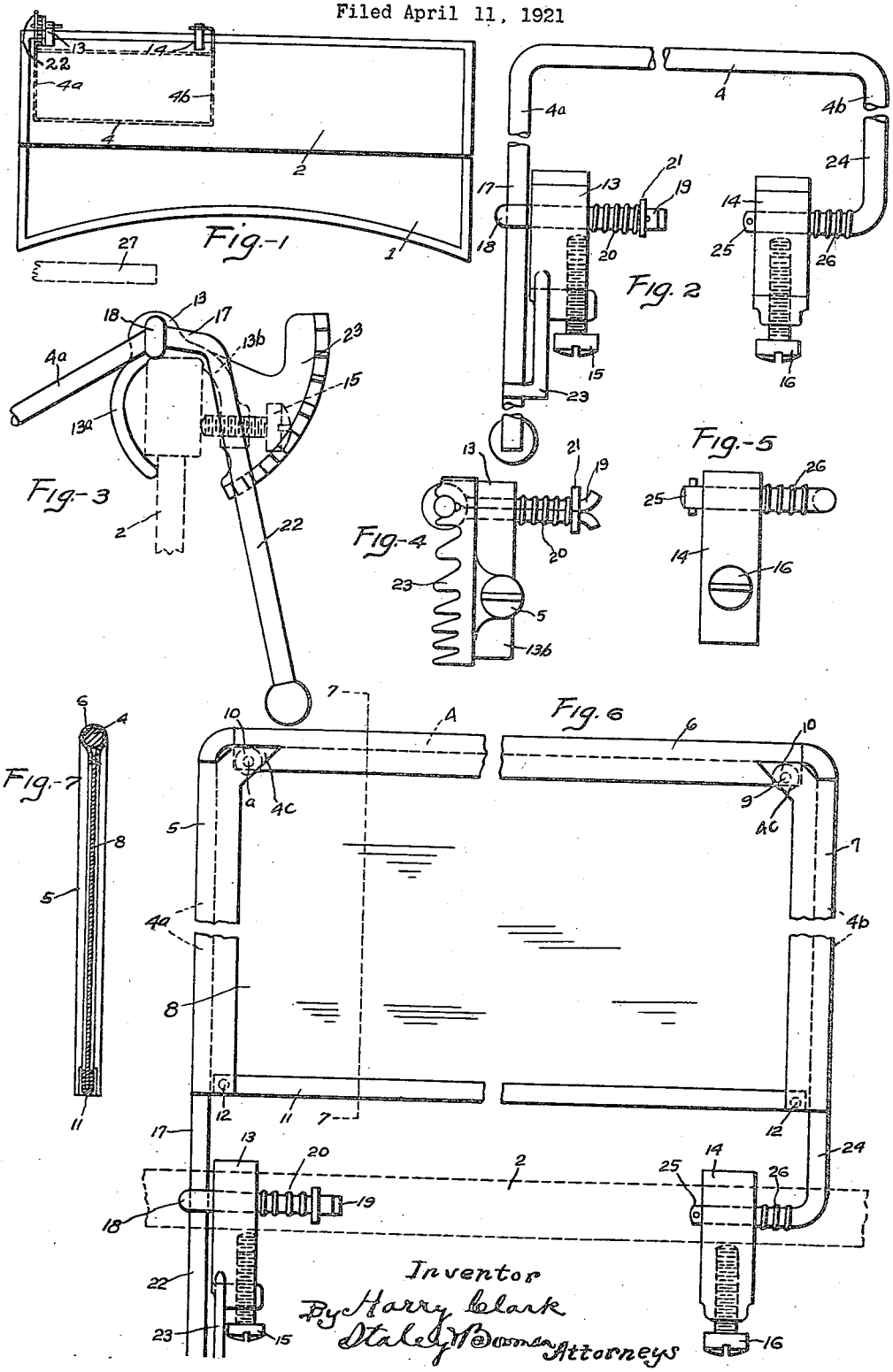

Patented Nov. 6, 1923.

1,473,599

UNITED STATES PATENT OFFICE.

HARRY CLARK, OF SPRINGFIELD, OHIO.

COMBINED ANTIGLARE AND WEATHER SHIELD.

Application filed April 11, 1921. Serial No. 460,347.

*To all whom it may concern:*

Be it known that I, HARRY CLARK, a citizen of the United States, residing at Springfield, in the county of Clark and State of Ohio, have invented certain new and useful Improvements in Combined Antiglare and Weather Shields, of which the following is a specification.

My invention relates to an improved antiglare and weather shield for automobiles, it particularly relating to a shield of this character arranged to be installed on the forward side of the conventional windshield.

The object of my invention is to provide a shield for eliminating the glare of the sun or of the head lights of approaching machines and also to act as a protection against rain, snow or sleet.

A further and more specific object of my invention is to provide a shield of the character referred to, which may be readily installed upon the conventional form of windshield now in use upon automobiles in such a way that it may be readily manipulated from the driver's seat for the purpose of adjusting it to different positions of use.

A further object of my invention is to provide a shield of the character referred to, which will be simple in construction, effective in operation and economical in manufacture.

In the accompanying drawings:—

Fig. 1 is a rear elevation of a conventional form of windshield showing my improvement applied thereto.

Fig. 2 is a plan view of the main support for my improved shield together with the securing and operating devices for the same.

Fig. 3 is a side elevation of the part shown in Fig. 2.

Fig. 4 is a rear view of one of the clamping devices.

Fig. 5 is a rear view of the companion clamping device.

Fig. 6 is a plan view of the complete shield, supports and operating devices.

Fig. 7 is a section on the line 7—7 of Fig. 6.

Referring to the drawings, 1 represents the lower section and 2 the upper section of a windshield of conventional form and to which is attached my improvement now to be described. The main support for the shield proper is formed of a metallic rod, preferably round in cross-section, and bent to a substantial U-shape so as to provide an outer side portion 4 and end portions $4^a$ and $4^b$. Folded about the said side and ends of this support are frame members 5, 6, and 7, as illustrated in Figs. 6 and 7, with the edges thereof in parallel relation and spaced apart sufficiently to form grooveways or channels to receive the transparent member 8 of the shield, which may be colored celluloid or other similar material. The outer ends of the two frame members 5 and 7 are formed with triangular-shaped extensions $4^c$ which will enclose the ends of the channeled part of the frame member 6, and are secured thereto by pins 9, the inner ends of which may have heads 10 of soft rubber, as shown in dotted lines in Fig. 6. to act as buffers. The inner ends of the channel portions of the frame members 5 and 7 are connected together by a channel-shape strip 11, by pins 12, which strip 11 receives the inner edge of the transparent member 8; the pins 12 being removable so as to permit renewal of the member 8 when necessary.

For the purpose of securing the shield thus described in position, I employ two clamping members 13 and 14. The clamping member 13 has curved arms $13^a$ and $13^b$ spaced a sufficient distance apart to embrace the top edge of any conventional form of windshield; the peculiar shape of the arms permitting them to accommodate themselves to the different types of windshield frames. The outer end of the forward arm $13^a$ will rest against some part of the forward side of the windshield while a set-screw 15, threaded in the rear arm $15^b$, engages the rear side of the windshield frame so that the clamp may be secured firmly in position. The other clamping member 14 is similar in shape and has a set screw 16 for similar purposes.

The portion $4^a$ of the main support has a rearward extension 17 which is projected through the eye 18 of a pin 19, which may be a cotter pin, which pin extends loosely through an aperture of the clamping member 13 so as to swivel therein, and has thereon a coiled spring 20, interposed between the clamp 13 and a collar 21 on the pin.

The portion 17 is further extended to provide a handle 22, preferably bent downwardly at an angle to the part 17 so as to bring it within convenient reach of the driver. Formed integrally with the clamping member 13 is a toothed segment 23, with the teeth of which the handle portion 22 is held in engagement by the action of the spring 20.

The side 4ᵇ of the main supporting member is likewise extended, as indicated at 24, which extension is bent at right angles to provide a trunnion 25 which projects loosely through an aperture in the clamping member 14. To assist the action of the spring 20, there may also be employed a second coil spring 26 coiled about the trunnion 25, and interposed between the clamping member 14 and the extension 24.

In operation when it is desired to raise or lower the shield, the operator by grasping the handle 22, and pressing laterally thereon, disengages the same from the teeth of the rack by compressing the springs 20 and 26 and thus may swing the auxiliary shield upwardly or downwardly to proper adjusted position, the springs, when pressure is removed from the handle, causing the handle to again engage the rack and hold the shield in its adjusted position.

It will be seen that by the arrangement of the clamping operating devices, they are accommodated in the space between the top edge of the windshield section 2 and the top of the vehicle (the visor board 27 of which is indicated in Fig. 3), which enables me to equip my improvement on any of the conventional forms of windshields, and my arrangement will be appreciated when it is considered that in all of the later types of automobiles, the space between the side of the windshield and the supporting arms for the same is entirely insufficient to accommodate any accessories of this character, thus making it impracticable, if not impossible, to equip an automobile with a device of this character, including an interiorly arranged operating device, except by an arrangement which permits the parts to be accommodated in the space above the windshield.

The auxiliary shield it will be observed is of a size and form sufficient to come within only the vision of the driver, which enables me to provide a shield of comparatively light structure which may be thus readily supported from the windshield and also be manipulated by devices which may be easily operated by one hand of the driver.

Having thus described my invention, I claim:—

1. In a device of the character described, the combination, with a windshield of a motor vehicle, of an auxiliary shield in front of said windshield, supports fixedly secured to the top edge of said windshield, extensions from said auxiliary shield projecting over the top edge of said windshield and out of contact therewith and pivotally connected with said supports, one of said extensions forming an operating handle on the rear side of said windshield, a toothed rack formed on one of said supports, with teeth on one side thereof and yielding means for holding said operating handle into sidewise engagement with said rack.

2. In a structure of the character described, the combination, with a windshield for a motor vehicle, of an auxiliary shield in front of said wind-shield, supports secured to the upper edge of said wind-shield to which said auxiliary shield is pivotally connected, an operating handle connected with said auxiliary shield and projected over the top of said wind-shield, said handle being capable of a lateral movement, a toothed member fixed at the rear of the windshield, and resilient means for normally holding said handle in engagement with the teeth of said member.

3. In a structure of the character described, the combination, with a wind-shield for a motor vehicle, of an auxiliary shield in front of said wind-shield, supports secured to the upper edge of said wind-shield to which said auxiliary shield is pivotally connected, an operating handle connected with said auxiliary shield and projected over the top of said wind-shield, a spring-pressed rotatable member having an eye to receive said handle, to permit said handle to yield laterally under pressure, and a toothed member at the rear of said wind-shield with which said handle is normally held in engagement by said spring-pressed member.

In testimony whereof, I have hereunto set my hand this 2nd day of April, 1921.

HARRY CLARK.

Witness:
CHAS. I. WELCH.